(12) United States Patent
Tam (10) Patent No.: US 12,283,687 B2
(45) Date of Patent: Apr. 22, 2025

(54) METHOD FOR FABRICATING WIDE AND CONTINUOUS DOUBLE-SIDED LITHIUM METAL ANODES

(71) Applicant: GM GLOBAL TECHNOLOGY OPERATIONS LLC, Detroit, MI (US)

(72) Inventor: Wai Ping Gloria Tam, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 453 days.

(21) Appl. No.: 17/690,077

(22) Filed: Mar. 9, 2022

(65) Prior Publication Data

US 2023/0307608 A1 Sep. 28, 2023

(51) Int. Cl.
*H01M 4/1395* (2010.01)
*H01M 4/02* (2006.01)
(Continued)

(52) U.S. Cl.
CPC ....... *H01M 4/1395* (2013.01); *H01M 4/0423* (2013.01); *H01M 4/134* (2013.01); *H01M 2004/027* (2013.01)

(58) Field of Classification Search
CPC ............. H01M 4/0423; H01M 4/0402; H01M 4/0435; H01M 4/0471; H01M 4/1395; H01M 4/043
See application file for complete search history.

(56) References Cited

U.S. PATENT DOCUMENTS 7,247,408 B2 7/2007 Skotheim et al.
7,282,302 B2 10/2007 Visco et al.
(Continued)

FOREIGN PATENT DOCUMENTS

WO WO2020210913 A1 10/2020

OTHER PUBLICATIONS

Wen-Yuan Liu, Zheng-Wen Fu, Qi-Zong Qin, "A sequential thin-film deposition equipment for in-situ fabricating all-solid-state thin film lithium batteries", ScienceDirect, Thin Solid Films vol. 515, Issues 7-8, Feb. 26, 2007, pp. 4045-4048.

*Primary Examiner* — Michael A Tolin
*Assistant Examiner* — Hana C Page
(74) *Attorney, Agent, or Firm* — Quinn IP Law (57) ABSTRACT

A method for fabricating wide and continuous double-sided lithium metal anodes includes thermally evaporating lithium to form first and second continuous lithium layers on respective first and second continuous polymer substrates, so as to form respective first and second continuous lithium/polymer sheets. The first and second continuous lithium/polymer sheets are laminated onto respective top and bottom surfaces of a continuous metallic substrate, which may be made of copper, with the first and second continuous lithium layers being disposed in direct contact with the respective top and bottom surfaces to form a continuous polymer/lithium/metal/lithium/polymer structure. The first and second continuous polymer substrates are then removed from the continuous polymer/lithium/metal/lithium/polymer structure to provide a continuous lithium/metal/lithium anode structure. Each of the first and second continuous lithium layers may be at least 200 millimeters wide, and may cover an entire respective width of the respective first and second continuous polymer substrates.

19 Claims, 4 Drawing Sheets

(51) Int. Cl.
   *H01M 4/04*      (2006.01)
   *H01M 4/134*     (2010.01)

(56) References Cited

U.S. PATENT DOCUMENTS

| | | |
|---|---|---|
| 8,697,287 B2 | 4/2014 | Salot et al. |
| 10,164,289 B2 | 12/2018 | Visco et al. |
| 10,916,761 B2 | 2/2021 | Herle et al. |
| 10,944,103 B2 | 3/2021 | Gopalakrishnan Nair et al. |
| 10,978,699 B2 * | 4/2021 | Herle ................. B32B 27/34 |
| 11,078,565 B2 | 8/2021 | Chung et al. |
| 11,185,915 B2 | 11/2021 | Herle |
| 2010/0051181 A1 * | 3/2010 | Mori .................. H01M 4/8896 156/390 |
| 2016/0181594 A1 * | 6/2016 | Balogh ............... H01M 4/0471 156/247 |
| 2017/0365854 A1 * | 12/2017 | Gopalakrishnannair .................... H01M 50/457 |
| 2019/0088987 A1 | 3/2019 | Herle |
| 2019/0372101 A1 | 12/2019 | Youn et al. |
| 2020/0343533 A1 | 10/2020 | Herle |
| 2020/0381699 A1 * | 12/2020 | Bonhomme ........ H01M 4/0471 |
| 2021/0062318 A1 | 3/2021 | Frey et al. |
| 2021/0126247 A1 | 4/2021 | Herle et al. |
| 2024/0355999 A1 * | 10/2024 | Joo .................... H01M 4/0423 |

\* cited by examiner

METHOD FOR FABRICATING WIDE AND CONTINUOUS DOUBLE-SIDED LITHIUM METAL ANODES

INTRODUCTION

This disclosure relates generally to methods for fabricating lithium metal anodes, and more particularly to a method for fabricating wide and continuous double-sided lithium metal anodes.

In the fabrication of lithium metal anodes, it is customary practice to extrude a lithium ingot into a foil of approximately 100 microns thick, followed by rolling to the desired thickness (approximately 20 to 50 microns). The resulting foil is then applied onto opposed surfaces of a metallic sheet substrate. However, the width of the extruded lithium foil is typically limited to a maximum of about 100 to 150 millimeters, due to the size of available lithium ingots. This in turn limits the size of the lithium metal anodes which may be produced when using such extruded lithium foils.

SUMMARY

According to one embodiment, a method for fabricating continuous lithium metal anodes includes thermally evaporating lithium to form first and second continuous lithium layers on respective first and second continuous polymer substrates, so as to form respective first and second continuous lithium/polymer sheets, laminating the first and second continuous lithium/polymer sheets onto respective top and bottom surfaces of a continuous metallic substrate, wherein the first and second continuous lithium layers are disposed in direct contact with the respective top and bottom surfaces to form a continuous polymer/lithium/metal/lithium/polymer structure, and removing the first and second continuous polymer substrates from the continuous polymer/lithium/metal/lithium/polymer structure to provide a continuous lithium/metal/lithium anode structure. In this method, the removing step may occur before or after the laminating step.

Each of the first and second continuous lithium layers may be at least 200 millimeters wide, or optionally at least 500 millimeters wide, and the continuous metallic substrate may be made of copper. The method may further include: feeding first and second continuous separator sheets onto the respective first and second continuous lithium layers of the first and second continuous lithium/polymer sheets; rolling each of the first and second continuous lithium/polymer sheets along with the respective first and second continuous separator sheets to form respective first and second continuous separator/lithium/polymer rolls; transporting the first and second continuous separator/lithium/polymer rolls to a lamination and decal transfer station; and unrolling the first and second continuous separator sheets from the first and second continuous separator/lithium/polymer rolls to present the first and second continuous lithium/polymer sheets. The method may also further include: applying a third continuous separator sheet onto the first or second continuous lithium layer on the continuous lithium/metal/lithium anode structure to form a continuous separator/lithium/metal/lithium structure; and coiling the continuous separator/lithium/metal/lithium structure into a finished roll.

Each of the first and second continuous lithium layers may include a respective plurality of lithium-free gaps along a respective length thereof, and may cover an entire respective width of the respective first and second continuous polymer substrates. Optionally, a first release layer may be disposed between the first continuous lithium layer and the first continuous polymer substrate, and a second release layer may be disposed between the second continuous lithium layer and the second continuous polymer substrate. Additionally, the first and second continuous lithium/polymer sheets may be formed simultaneously.

According to another embodiment, a method for fabricating continuous lithium metal anodes includes: (i) thermally evaporating lithium to form first and second continuous lithium layers on respective first and second continuous polymer substrates, so as to form respective first and second continuous lithium/polymer sheets; (ii) feeding first and second continuous separator sheets onto the respective first and second continuous lithium layers of the first and second continuous lithium/polymer sheets; (iii) rolling each of the first and second continuous lithium/polymer sheets along with the respective first and second continuous separator sheets to form respective first and second continuous separator/lithium/polymer rolls; (iv) transporting the first and second continuous separator/lithium/polymer rolls to a lamination and decal transfer station; (v) unrolling the first and second continuous separator sheets from the first and second continuous separator/lithium/polymer rolls to present the first and second continuous lithium/polymer sheets; (vi) laminating the first and second continuous lithium/polymer sheets onto respective top and bottom surfaces of a continuous copper substrate, wherein the first and second continuous lithium layers are disposed in direct contact with the respective top and bottom surfaces to form a continuous polymer/lithium/copper/lithium/polymer structure; and (vii) removing the first and second continuous polymer substrates from the continuous polymer/lithium/copper/lithium/polymer structure to provide a continuous lithium/copper/lithium anode structure.

In this method each of the first and second continuous lithium layers may be at least 200 millimeters wide, or optionally at least 500 millimeters wide, and each of the first and second continuous lithium layers may cover an entire respective width of the respective first and second continuous polymer substrates. The method may further include applying a third continuous separator sheet onto the first or second continuous lithium layer on the continuous lithium/copper/lithium anode structure to form a continuous separator/lithium/copper/lithium structure, and coiling the continuous separator/lithium/copper/lithium structure into a finished roll. Additionally, a first release layer may be disposed between the first continuous lithium layer and the first continuous polymer substrate, and a second release layer may be disposed between the second continuous lithium layer and the second continuous polymer substrate.

According to yet another embodiment, a method for fabricating wide and continuous double-sided lithium metal anodes includes: (a) forming first and second continuous layers of lithium on respective first and second continuous polymer substrates by thermal evaporation of the lithium, so as to form respective first and second continuous lithium/polymer sheets, wherein each of the first and second continuous lithium layers is at least 200 millimeters wide and wherein each of the first and second continuous layers of lithium covers an entire respective width of the respective first and second continuous polymer substrates; (b) feeding first and second continuous separator sheets onto the respective first and second continuous layers of lithium of the first and second continuous lithium/polymer sheets; (c) rolling each of the first and second continuous lithium/polymer sheets along with the respective first and second continuous separator sheets to form respective first and second continuous separator/lithium/polymer rolls; (d) unrolling the first and second continuous separator sheets from the first and second continuous separator/lithium/polymer rolls to present the first and second continuous lithium/polymer sheets; (e) laminating the first and second continuous lithium/polymer sheets onto respective top and bottom surfaces of a continuous copper substrate, wherein the first and second continuous layers of lithium are disposed in direct contact with the respective top and bottom surfaces to form a continuous polymer/lithium/copper/lithium/polymer structure; (f) removing the first and second continuous polymer substrates from the continuous polymer/lithium/copper/lithium/polymer structure to provide a continuous lithium/copper/lithium anode structure; (g) applying a third continuous separator sheet onto the first or second continuous lithium layer on the continuous lithium/copper/lithium anode structure to form a continuous separator/lithium/copper/lithium structure; and (h) coiling the continuous separator/lithium/copper/lithium structure into a finished roll.

The method may further include, between the rolling and unrolling steps, transporting the first and second continuous separator/lithium/polymer rolls to a lamination and decal transfer station. Additionally, each of the first and second continuous lithium layers may be at least 500 millimeters wide.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Referring now to the drawings, wherein like numerals indicate like parts in the several views, a method 100 for fabricating wide and continuous double-sided lithium metal anodes 20 is shown and described herein. The method 100 is capable of providing continuous lithium metal anodes which are much wider than can be produced using customary methods which produce anodes limited to a maximum of 100 to 150 millimeters in width. For example, the method 100 presented herein may be used to fabricate continuous double-sided lithium metal anodes 20 which are greater than 200 millimeters wide, or even greater than 500 millimeters wide. In fact, the width of the lithium metal anodes 20 produced by the method 100 described herein is only limited by the size of the thermal evaporation chamber(s) used to lithiate a polymer substrate or carrier, as described in detail below. For example, the method 100 may even be used to produce a continuous double-sided lithium metal anode 20 over 1 meter in width.

Figure 1:
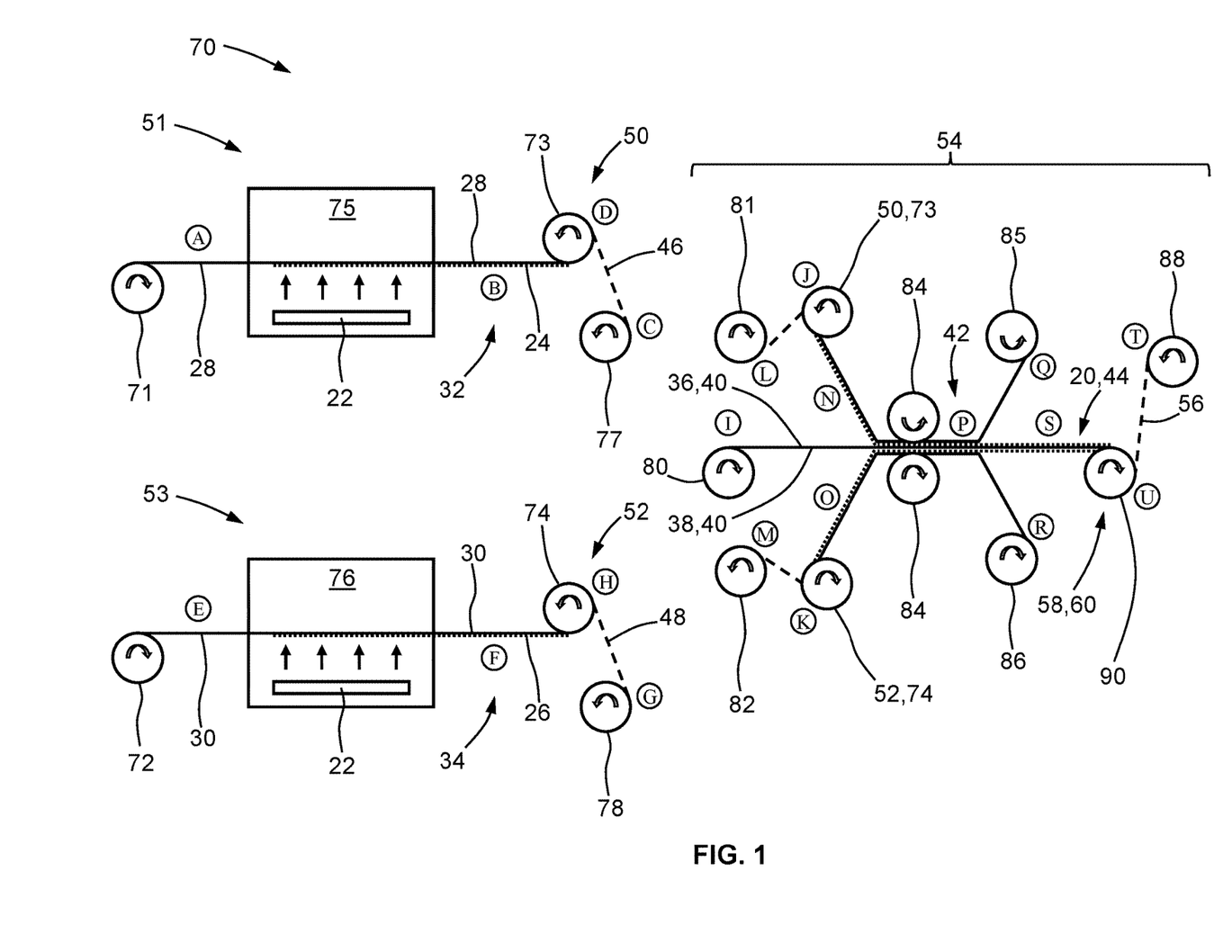
FIG. 1 is a schematic view of a system for fabricating wide and continuous double-sided lithium metal anodes.
Figure 9:
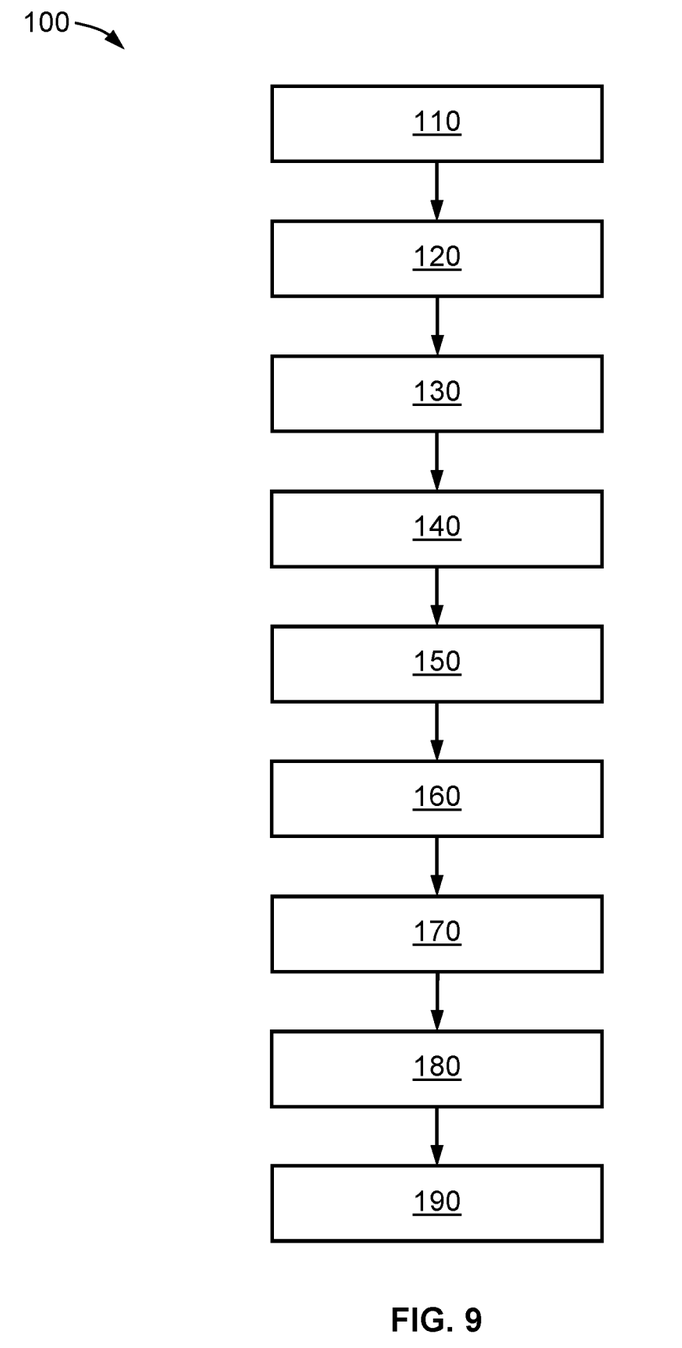
FIG. 9 is a flowchart for a method of fabricating wide and continuous double-sided lithium metal anodes.

FIG. 1 shows a schematic view of a system 70 for fabricating wide and continuous double-sided lithium metal anodes 20, FIG. 2-6 shows schematic cross-sectional views illustrating the sequence of materials used for fabricating the anodes 20, and FIG. 9 shows a flowchart for a method 100 of fabricating the anodes 20 utilizing the system 70 of FIG. 1. The system 70 includes two thermal evaporation lines 51, 53, and a lamination and decal transfer station 54 downstream of the two thermal evaporation lines 51, 53. Note that while the exemplary system 70 shown in FIG. 1 includes two separate thermal evaporation lines 51, 53, the method 100 of the present disclosure may also be carried out by a system in which some or all of the two separate thermal evaporation lines 51, 53 are combined into a single thermal evaporation line. For example, the first and second thermal evaporation chambers 75, 76 may be combined into a single thermal evaporation chamber. Also, while the exemplary system 70 shows the two thermal evaporation lines 51, 53 as being separate from the lamination and decal transfer station 54, with the rolls 50, 52 of material at the end of the two thermal evaporation lines 51, 53 being duplicated in (e.g., transported to) the lamination and decal transfer station 54, in other configurations the one or more thermal evaporation lines 51, 53 and the lamination and decal transfer station 54 may be combined into a single continuous manufacturing line.

As shown in FIG. 1, the first thermal evaporation line 51 includes a first thermal evaporation chamber 75, a first polymer substrate feed roller 71 which holds a roll of first continuous polymer substrate 28 that is fed into the first thermal evaporation chamber 75, and a first polymer substrate take-up roller 73 which receives the first continuous polymer substrate 28 from the first thermal evaporation chamber 75. Similarly, the second thermal evaporation line 53 includes a second thermal evaporation chamber 76, a second polymer substrate feed roller 72 which holds a roll of second continuous polymer substrate 30 that is fed into the second thermal evaporation chamber 76, and a second polymer substrate take-up roller 74 which receives the second continuous polymer substrate 30 from the second thermal evaporation chamber 76. Each of the thermal evaporation chambers 75, 76 has a respective source of lithium 22, which is thermally evaporated so as to coat or be deposited on one side of the respective first or second continuous polymer substrate 28, 30 with a respective first or second continuous lithium layer 24, 26 as the continuous polymer substrate 28, 30 passes through the chamber 75, 76.

Figure 2:
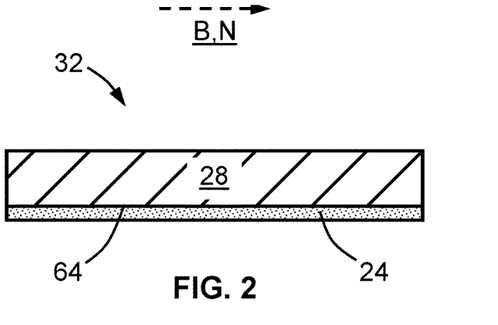
FIGS. 2-6 are schematic cross-sectional views illustrating the sequence of materials used for fabricating wide and continuous double-sided lithium metal anodes.

FIG. 1 shows various process flow points along the fabrication process, indicated by the encircled letters "A" through "U". (These process flow points are hereinafter presented in brackets, as in [A], [B], etc.) At point [A], only the first continuous polymer substrate 28 is presented, but after the first substrate 28 passes through the first thermal evaporation chamber 75, it can be seen that at point [B] a first continuous lithium layer 24 has been deposited on an underside surface of the first substrate 28, thus presenting a first continuous lithium/polymer sheet 32. A cross-sectional view of the materials present at point [B] is shown in FIG. 2, which may optionally include a first release layer 64 interposed between the first continuous polymer substrate 28 and the first continuous lithium layer 24. (Note that FIG. 2 includes a dashed arrow pointing to the right, which indicates a rightward process flow direction at point [B], as well as at point [N] as discussed below. In FIGS. 2-6, the rightward, clockwise and counter-clockwise directions of the dashed arrows refer to the directions illustrated in the process flow of FIG. 1. However, it should be noted that these directions are merely exemplary.)

Figure 3:
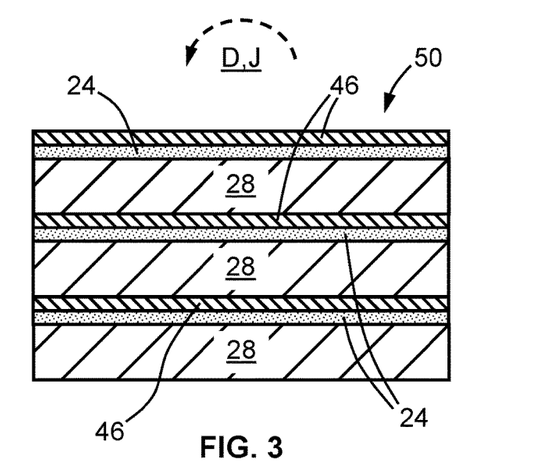

At point [C], a first separator sheet feed roller 77 feeds a first continuous separator sheet 46 which may be placed onto the first continuous lithium layer 24 as the first continuous lithium/polymer sheet 32 is rolled onto the first polymer substrate take-up roller 73 at point [D], thus presenting a first continuous separator/lithium/polymer roll 50. Note that the first polymer substrate take-up roller 73 at point [D] may also be referred to as a first separator/lithium/polymer take-up roller 73. A cross-sectional view of the materials present at point [D] is shown in FIG. 3, which illustrates the three outermost layers of materials that are wrapped around the first separator/lithium/polymer take-up roller 73. (This same stack-up of materials also occurs at point [J] as well, as discussed below.)

Similarly, turning to the second thermal evaporation line 53 of FIG. 1, at point [E], only the second continuous polymer substrate 30 is presented, but after the second substrate 30 passes through the second thermal evaporation chamber 76, it can be seen that at point [F] a second continuous lithium layer 26 has been deposited on an underside surface of the second substrate 30, thus presenting a second continuous lithium/polymer sheet 34. The cross-sectional view of the materials shown in FIG. 2 for point [B] similarly applies to point [F] as well (with reference numerals 24, 28, 32 and 64 substituted by reference numerals 26, 30, 34 and 66, respectively), and may optionally include a second release layer 66 interposed between the second continuous polymer substrate 30 and the second continuous lithium layer 26.

At point [G], a second separator sheet feed roller 78 feeds a second continuous separator sheet 48 which may be placed onto the second continuous lithium layer 26 as the second continuous lithium/polymer sheet 34 is rolled onto the second polymer substrate take-up roller 74 at point [H], thus presenting a second continuous separator/lithium/polymer roll 52. Note that the second polymer substrate take-up roller 74 at point [H] may also be referred to as a second separator/lithium/polymer take-up roller 74. The cross-sectional view of the materials shown in FIG. 3 for point [D] similarly applies to point [H] as well (with reference numerals 24, 28, 46 and 50 substituted by reference numerals 26, 30, 48 and 52, respectively, thereby illustrating the three outermost layers of materials that are wrapped around the second separator/lithium/polymer take-up roller 74, with this same stack-up of materials also occurring at point [K] as well, as discussed below.)

As illustrated in FIG. 1, the first and second thermal evaporation lines 51, 53 produce respective first and second continuous separator/lithium/polymer rolls 50, 52. These rolls 50, 52 may be transported to the lamination and decal transfer station 54. Alternatively, the first and second separator sheet feed rollers 77, 78, the first and second separator sheet take-up rollers 81, 82, and the first and second continuous separator sheets 46, 48 may be omitted, with the first and second continuous lithium/polymer sheets 32, 34 extending directly from the first and second thermal evaporation chambers 75, 76 and into the lamination and decal transfer station 54.

Figure 4:
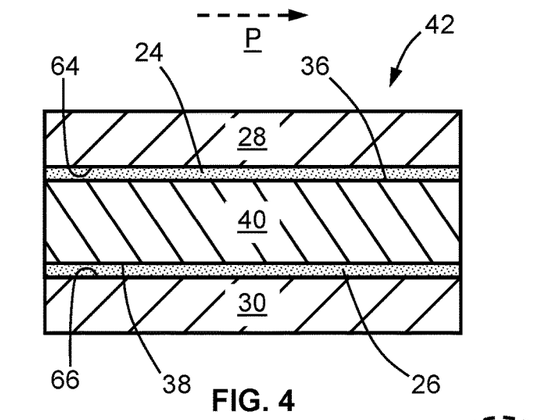

The lamination and decal transfer station 54 includes a metallic substrate feed roller 80 at point [I] which holds a roll of continuous metallic substrate 40 and feeds it toward a set of opposed lamination rollers 84. After passing through the lamination rollers 84, the continuous metallic substrate 40 is then rolled up onto a metallic substrate take-up roller 90. As illustrated in FIG. 1, at points [J] and [K], the first and second continuous separator/lithium/polymer rolls 50, 52 are unrolled, with the first and second continuous separator sheets 46, 48 being peeled off and rolled onto respective first and second continuous separator sheet take-up rolls 81, 82 at points [L] and [M], and the first and second continuous lithium/polymer sheets 32, 34 (at points [N] and [O]) being fed onto respective top and bottom surfaces 36, 38 of the continuous metallic substrate 40, with the first and second continuous lithium layers 24, 26 being disposed in direct contact with the top and bottom surfaces 36, 38. After passing through the lamination rollers 84, the first and second continuous lithium layers 24, 26 are essentially decal transferred onto the continuous metallic substrate 40, and the first and second continuous lithium/polymer sheets 32, 34 and the continuous metallic substrate 40 that is sandwiched between the first and second continuous lithium/polymer sheets 32, 34 collectively form a continuous polymer/lithium/metal/lithium/polymer structure 42 at point [P], which is illustrated in FIG. 4.

Figure 5:
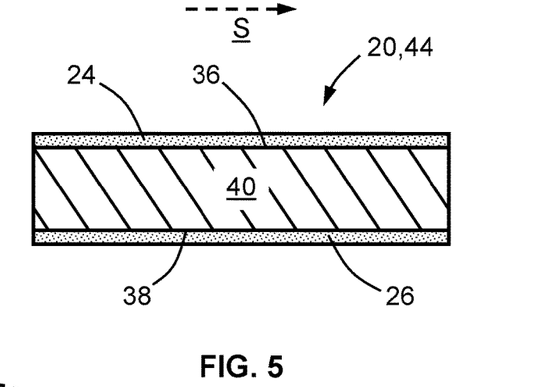
Figure 6:
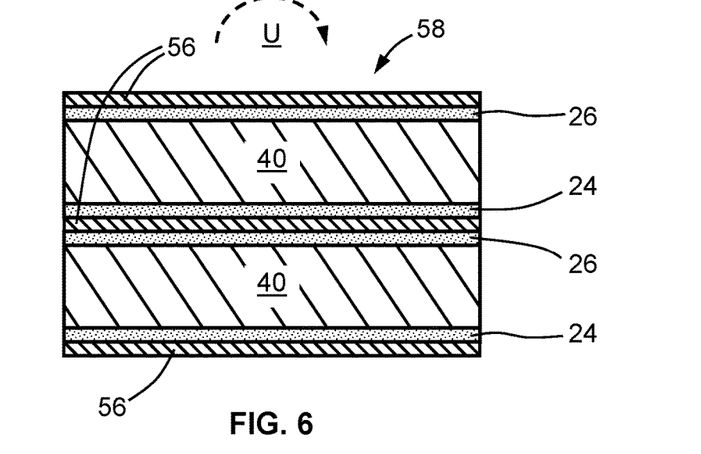

At points [Q] and [R], third and fourth polymer substrate take-up rollers 85, 86 are disposed, which are utilized to roll up the first and second continuous polymer substrates 28, 30 that are peeled away from their respective first and second continuous lithium layers 24, 26, thereby leaving a continuous lithium/metal/lithium anode structure 44 at point [S], as illustrated in FIG. 5. This continuous lithium/metal/lithium anode structure 44 may also be characterized as the aforementioned wide and continuous double-sided lithium metal anode 20. At point [T], a third separator sheet feed roller 88 may be disposed which feeds a third continuous separator sheet 56 onto the continuous lithium/metal/lithium anode structure 44 that is being rolled onto the metallic substrate take-up roller 90 (which may also be referred to as a separator/lithium/metal/lithium anode structure take-up roller 90). And at point [U], the third continuous separator sheet 56 and the continuous lithium/metal/lithium anode structure 44 form a continuous separator/lithium/metal/lithium structure 58, as illustrated in FIG. 6, and which is rolled around the separator/lithium/metal/lithium anode structure take-up roller 90 to form a finished roll 60.

Figure 7:
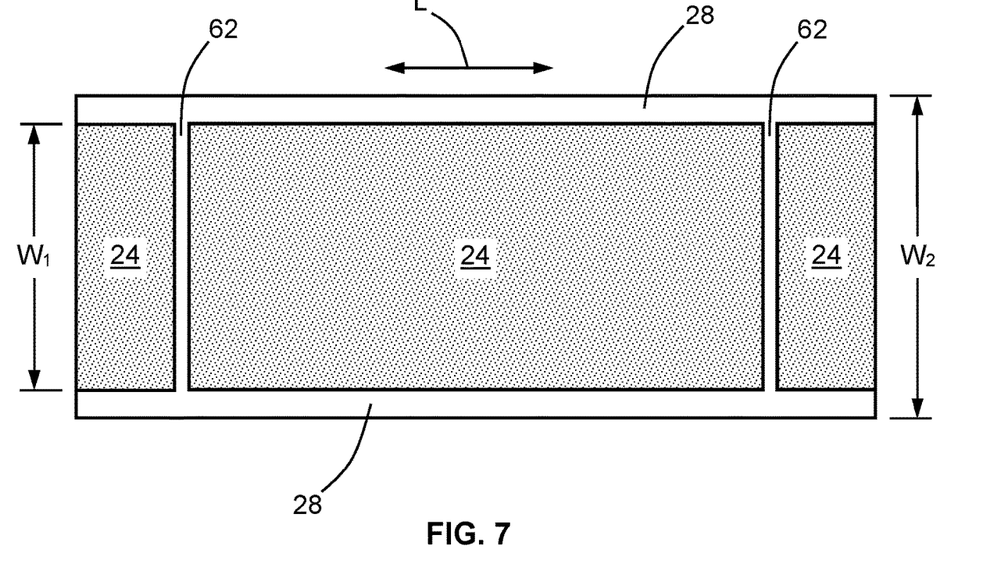
FIG. 7 is a schematic bottom plan view of one configuration of a continuous lithium/polymer sheet.
Figure 8:
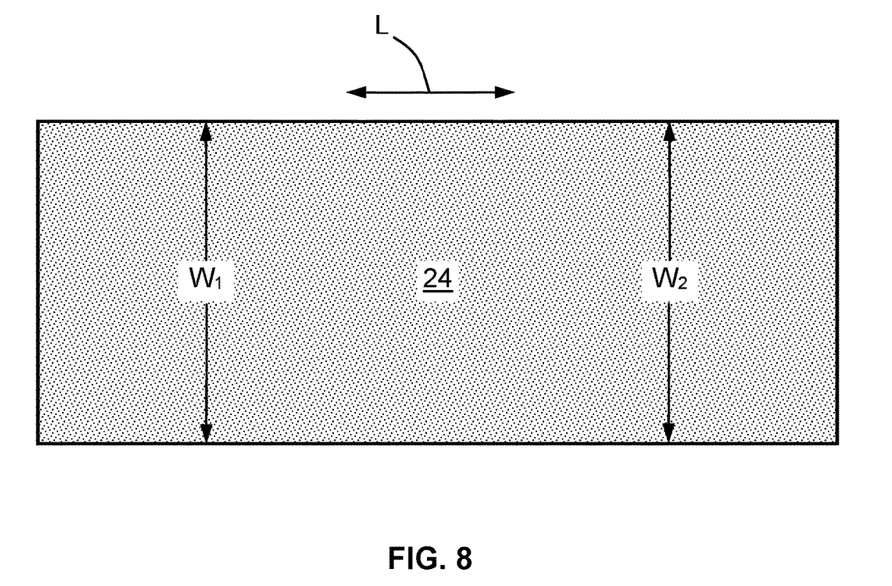
FIG. 8 is a schematic bottom plan view of another configuration of a continuous lithium/polymer sheet.

FIGS. 7-8 show schematic bottom plan views of two different configurations of the continuous lithium/polymer sheet 32 of FIG. 2. In the first configuration shown in FIG. 7, the first continuous lithium layer 24 has a first width $W_1$ that is smaller than the width $W_2$ of the first continuous polymer substrate 28. This configuration also shows a plurality of lithium-free gaps 62 along the length L of the first continuous polymer substrate 28. These gaps 62 may be produced if the fabrication method 100 is an intermittent or batch process (rather than a continuous process), in which a predetermined length of the first continuous polymer substrate 28 is advanced into the first thermal evaporation chamber 75, then the lithium 22 is thermally evaporated, and then the first continuous polymer substrate 28 is again advanced by the predetermined length (plus some small additional length represented by the gap 62). Note that while FIGS. 7-8 only show the widths $W_1$, $W_2$, length L and lithium-free gaps 62 being associated with the first continuous lithium layer 24 and the first continuous polymer substrate 28, it should be apparent that these features may also be associated with the second continuous lithium layer 26 and the second continuous polymer substrate 30 as well. Alternatively, the second configuration shown in FIG. 8 represents a continuous process, in which the first continuous polymer substrate 28 is advanced through the first thermal evaporation chamber 75 at a constant and continuous rate. Also, in the second configuration, the first continuous lithium layer 24 covers the entire width $W_2$ of the first continuous polymer substrate 28, such that $W_1=W_2$.

FIG. 9 shows a flowchart for a method 100 of fabricating wide and continuous double-sided lithium metal anodes 20. The method 100 includes, at block 110, thermally evaporating lithium 22 to form first and second continuous lithium layers 24, 26 on respective first and second continuous polymer substrates 28, 30, so as to form respective first and second continuous lithium/polymer sheets 32, 34. At block 160, the first and second continuous lithium/polymer sheets 32, 34 are laminated onto respective top and bottom surfaces 36, 38 of a continuous metallic substrate 40, wherein the first and second continuous lithium layers 24, 26 are disposed in direct contact with the respective top and bottom surfaces 36, 38 to form a continuous polymer/lithium/metal/lithium/polymer structure 42. And at block 170, the first and second continuous polymer substrates 28, 30 are removed from the continuous polymer/lithium/metal/lithium/polymer structure 42 to provide a continuous lithium/metal/lithium anode structure 44. In this method, the removing step at block 170 may occur before or after the laminating step of block 160.

Each of the first and second continuous lithium layers 24, 26 may be at least 200 millimeters wide, or optionally at least 500 millimeters wide, and the continuous metallic substrate 40 may be made of copper. The method 100 may further include: at block 120, feeding first and second continuous separator sheets 46, 48 onto the respective first and second continuous lithium layers 24, 26 of the first and second continuous lithium/polymer sheets 32, 34; at block 130, rolling each of the first and second continuous lithium/polymer sheets 32, 34 along with the respective first and second continuous separator sheets 46, 48 to form respective first and second continuous separator/lithium/polymer rolls 50, 52; at block 140, transporting the first and second continuous separator/lithium/polymer rolls 50, 52 to a lamination and decal transfer station 54; and, at block 150, unrolling the first and second continuous separator sheets 46, 48 from the first and second continuous separator/lithium/polymer rolls 50, 52 to present the first and second continuous lithium/polymer sheets 32, 34. The method 100 may also further include: at block 180, applying a third continuous separator sheet 56 onto the first or second continuous lithium layer 24, 26 on the continuous lithium/metal/lithium anode structure 44 to form a continuous separator/lithium/metal/lithium structure 58; and, at block 190, coiling the continuous separator/lithium/metal/lithium structure 58 into a finished roll 60.

Each of the first and second continuous lithium layers 24, 26 may include a respective plurality of lithium-free gaps 62 along a respective length L thereof, and may cover an entire respective width $W_2$ of the respective first and second continuous polymer substrates 28, 30. Optionally, a first release layer 64 may be disposed between the first continuous lithium layer 24 and the first continuous polymer substrate 28, and a second release layer 66 may be disposed between the second continuous lithium layer 26 and the second continuous polymer substrate 30. Additionally, the first and second continuous lithium/polymer sheets 32, 34 may be formed simultaneously, such as by the first and second thermal evaporation lines 51, 53 operating simultaneously.

According to another embodiment, a method 100 for fabricating continuous lithium metal anodes 20, 44 includes: (i) at block 110, thermally evaporating lithium 22 to form first and second continuous lithium layers 24, 26 on respective first and second continuous polymer substrates 28, 30, so as to form respective first and second continuous lithium/polymer sheets 32, 34; (ii) at block 120, feeding first and second continuous separator sheets 46, 48 onto the respective first and second continuous lithium layers 24, 26 of the first and second continuous lithium/polymer sheets 32, 34; (iii) at block 130, rolling each of the first and second continuous lithium/polymer sheets 32, 34 along with the respective first and second continuous separator sheets 46, 48 to form respective first and second continuous separator/lithium/polymer rolls 50, 52; (iv) at block 140, transporting the first and second continuous separator/lithium/polymer rolls 50, 52 to a lamination and decal transfer station 54; (v) at block 150, unrolling the first and second continuous separator sheets 46, 48 from the first and second continuous separator/lithium/polymer rolls 50, 52 to present the first and second continuous lithium/polymer sheets 32, 34; (vi) at block 160, laminating the first and second continuous lithium/polymer sheets 32, 34 onto respective top and bottom surfaces 36, 38 of a continuous copper substrate 40, wherein the first and second continuous lithium layers 32, 34 are disposed in direct contact with the respective top and bottom surfaces 36, 38 to form a continuous polymer/lithium/copper/lithium/polymer structure 42; and (vii) at block 170, removing the first and second continuous polymer substrates 28, 30 from the continuous polymer/lithium/copper/lithium/polymer structure 42 to provide a continuous lithium/copper/lithium anode structure 44.

In this method 100, each of the first and second continuous lithium layers 24, 26 may be at least 200 millimeters wide, or optionally at least 500 millimeters wide, and each of the first and second continuous lithium layers 24, 26 may cover an entire respective width $W_2$ of the respective first and second continuous polymer substrates 28, 30. The method 100 may further include, at block 180, applying a third continuous separator sheet 56 onto the first or second continuous lithium layer 24, 26 on the continuous lithium/copper/lithium anode structure 44 to form a continuous separator/lithium/copper/lithium structure 58, and, at block 190, coiling the continuous separator/lithium/copper/lithium structure 58 into a finished roll 60. Additionally, a first release layer 64 may be disposed between the first continuous lithium layer 24 and the first continuous polymer substrate 28, and a second release layer 66 may be disposed between the second continuous lithium layer 26 and the second continuous polymer substrate 30.

According to yet another embodiment, a method 100 for fabricating wide and continuous double-sided lithium metal anodes 20, 44 includes: (a) at block 110, forming first and second continuous layers 24, 26 of lithium 22 on respective first and second continuous polymer substrates 28, 30 by thermal evaporation of the lithium 22, so as to form respective first and second continuous lithium/polymer sheets 32, 34, wherein each of the first and second continuous lithium layers 24, 26 is at least 200 millimeters wide and wherein each of the first and second continuous layers 24, 26 of lithium 22 covers an entire respective width $W_2$ of the respective first and second continuous polymer substrates 28, 30; (b) at block 120, feeding first and second continuous separator sheets 46, 48 onto the respective first and second continuous layers 24, 26 of lithium 22 of the first and second continuous lithium/polymer sheets 32, 34; (c) at block 130, rolling each of the first and second continuous lithium/polymer sheets 32, 34 along with the respective first and second continuous separator sheets 46, 48 to form respective first and second continuous separator/lithium/polymer rolls 50, 52; (d) at block 150, unrolling the first and second continuous separator sheets 46, 48 from the first and second continuous separator/lithium/polymer rolls 50, 52 to present the first and second continuous lithium/polymer sheets 32, 34; (e) at block 160, laminating the first and second continuous lithium/polymer sheets 32, 34 onto respective top and bottom surfaces 36, 38 of a continuous copper substrate 40, wherein the first and second continuous layers 24, 26 of lithium 22 are disposed in direct contact with the respective top and bottom surfaces 36, 38 to form a continuous polymer/lithium/copper/lithium/polymer structure 42; (f) at block 170, removing the first and second continuous polymer substrates 28, 30 from the continuous polymer/lithium/copper/lithium/polymer structure 42 to provide a continuous lithium/copper/lithium anode structure 44; (g) at block 180, applying a third continuous separator sheet 56 onto the first or second continuous lithium layer 24, 26 on the continuous lithium/copper/lithium anode structure 44 to form a continuous separator/lithium/copper/lithium structure 58; and (h) at block 190, coiling the continuous separator/lithium/copper/lithium structure 58 into a finished roll 60.

The method 100 may further include, between the rolling and unrolling steps 130, 150 at block 140, transporting the first and second continuous separator/lithium/polymer rolls 50, 52 to a lamination and decal transfer station 54. Additionally, each of the first and second continuous lithium layers 24, 26 may be at least 500 millimeters wide.

As noted above, the method 100 described herein is capable of producing continuous double-sided lithium metal anodes 20, 44 having a width $W_1$ of at least 200 millimeters (mm) wide The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method for fabricating continuous lithium metal anodes, comprising:
thermally evaporating lithium to form first and second continuous lithium layers on respective first and second continuous polymer substrates, so as to form respective first and second continuous lithium/polymer sheets, wherein the first second continuous lithium layers are continuous along a respective width thereof, each of the first and second continuous lithium layers is at least 200 millimeters wide, and each of the first and second continuous lithium layers covers an entire respective width of the respective first and second continuous polymer substrates;

feeding first and second continuous separator sheets onto the respective first and second continuous lithium layers of the first and second continuous lithium/polymer sheets;

rolling each of the first and second continuous lithium/polymer sheets along with the respective first and second continuous separator sheets to form respective first and second continuous separator/lithium/polymer rolls;

unrolling the first and second continuous separator sheets from the first and second continuous separator/lithium/polymer rolls to present the first and second continuous lithium/polymer sheets;

laminating the first and second continuous lithium/polymer sheets onto respective top and bottom surfaces of a continuous metallic substrate, wherein the first and second continuous lithium layers are disposed in direct contact with the respective top and bottom surfaces to form a continuous polymer/lithium/metal/lithium/polymer structure;

removing the first and second continuous polymer substrates from the continuous polymer/lithium/metal/lithium/polymer structure to provide a continuous lithium/metal/lithium anode structure;

applying a third continuous separator sheet onto the first or second continuous lithium layer on the continuous lithium/metal/lithium anode structure to form a continuous separator/lithium/metal/lithium structure; and coiling the continuous separator/lithium/metal/lithium structure into a finished roll.

2. The method of claim 1, wherein each of the first and second continuous lithium layers is at least 500 millimeters wide.

3. The method of claim 1, wherein the continuous metallic substrate is made of copper.

4. The method of claim 1, further comprising:
transporting the first and second continuous separator/lithium/polymer rolls to a lamination and decal transfer station.

5. The method of claim 1, wherein each of the first and second continuous lithium layers includes a respective plurality of lithium-free gaps along a respective length thereof.

6. The method of claim 1, wherein the removing step occurs before or after the laminating step.

7. The method of claim 1, wherein a first release layer is disposed between the first continuous lithium layer and the first continuous polymer substrate, and a second release layer is disposed between the second continuous lithium layer and the second continuous polymer substrate.

8. The method of claim 1, wherein the first and second continuous lithium/polymer sheets are formed simultaneously.

9. A method for fabricating continuous lithium metal anodes, comprising:
thermally evaporating lithium to form first and second continuous lithium layers on respective first and second continuous polymer substrates, so as to form respective first and second continuous lithium/polymer sheets, wherein the first and second continuous lithium layers are continuous along a respective width thereof, each of the first and second continuous lithium layers is at least 200 millimeters wide, and each of the first and second continuous lithium layers covers an entire respective width of the respective first and second continuous polymer substrates;

feeding first and second continuous separator sheets onto the respective first and second continuous lithium layers of the first and second continuous lithium/polymer sheets;

rolling each of the first and second continuous lithium/polymer sheets along with the respective first and second continuous separator sheets to form respective first and second continuous separator/lithium/polymer rolls;

transporting the first and second continuous separator/lithium/polymer rolls to a lamination and decal transfer station;

unrolling the first and second continuous separator sheets from the first and second continuous separator/lithium/polymer rolls to present the first and second continuous lithium/polymer sheets;

laminating the first and second continuous lithium/polymer sheets onto respective top and bottom surfaces of a continuous copper substrate, wherein the first and second continuous lithium layers are disposed in direct contact with the respective top and bottom surfaces to form a continuous polymer/lithium/copper/lithium/polymer structure;

removing the first and second continuous polymer substrates from the continuous polymer/lithium/copper/lithium/polymer structure to provide a continuous lithium/copper/lithium anode structure;

applying third continuous separator sheet onto the first or second continuous lithium layer on the continuous lithium/copper/lithium anode structure to form a continuous separator/lithium/copper/lithium structure; and coiling the continuous separator/lithium/copper/lithium structure into a finished roll.

10. The method of claim 9, wherein each of the first and second continuous lithium layers is at least 500 millimeters wide.

11. The method of claim 9, wherein a first release layer is disposed between the first continuous lithium layer and the first continuous polymer substrate, and a second release layer is disposed between the second continuous lithium layer and the second continuous polymer substrate.

12. The method of claim 9, wherein each of the first and second continuous lithium layers includes a respective plurality of lithium-free gaps along a respective length thereof.

13. The method of claim 9, wherein the first and second continuous lithium/polymer sheets are formed simultaneously.

14. A method for fabricating wide and continuous double-sided lithium metal anodes, comprising:

forming first and second continuous layers of lithium on respective first and second continuous polymer substrates by thermal evaporation of the lithium, so as to form respective first and second continuous lithium/polymer sheets, wherein the first and second continuous layers of lithium are continuous along a respective width thereof, wherein each of the first and second continuous lithium layers is at least 200 millimeters wide and wherein each of the first and second continuous layers of lithium covers an entire respective width of the respective first and second continuous polymer substrates;

feeding first and second continuous separator sheets onto the respective first and second continuous layers of lithium of the first and second continuous lithium/polymer sheets;

rolling each of the first and second continuous lithium/polymer sheets along with the respective first and second continuous separator sheets to form respective first and second continuous separator/lithium/polymer rolls;

unrolling the first and second continuous separator sheets from the first and second continuous separator/lithium/polymer rolls to present the first and second continuous lithium/polymer sheets;

laminating the first and second continuous lithium/polymer sheets onto respective top and bottom surfaces of a continuous copper substrate, wherein the first and second continuous layers of lithium are disposed in direct contact with the respective top and bottom surfaces to form a continuous polymer/lithium/copper/lithium/polymer structure;

removing the first and second continuous polymer substrates from the continuous polymer/lithium/copper/lithium/polymer structure to provide a continuous lithium/copper/lithium anode structure;

applying a third continuous separator sheet onto the first or second continuous lithium layer on the continuous lithium/copper/lithium anode structure to form a continuous separator/lithium/copper/lithium structure; and coiling the continuous separator/lithium/copper/lithium structure into a finished roll.

15. The method of claim 14, wherein each of the first and second continuous lithium layers is at least 500 millimeters wide.

16. The method of claim 14, further comprising, between the rolling and unrolling steps:

transporting the first and second continuous separator/lithium/polymer rolls to a lamination and decal transfer station.

17. The method of claim 14, wherein each of the first and second continuous layers of lithium includes a respective plurality of lithium-free gaps along a respective length thereof.

18. The method of claim 14, wherein a first release layer is disposed between the first continuous lithium layer and the first continuous polymer substrate, and a second release layer is disposed between the second continuous lithium layer and the second continuous polymer substrate.

19. The method of claim 14, wherein the first and second continuous lithium/polymer sheets are formed simultaneously.

* * * * *